June 3, 1958   P. D. SANBORN   2,837,255
FAUCET-GASKET UNIT FOR DRUMS
Filed April 13, 1955
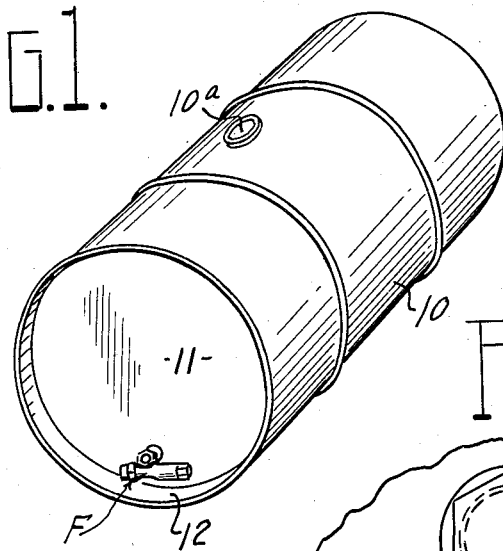
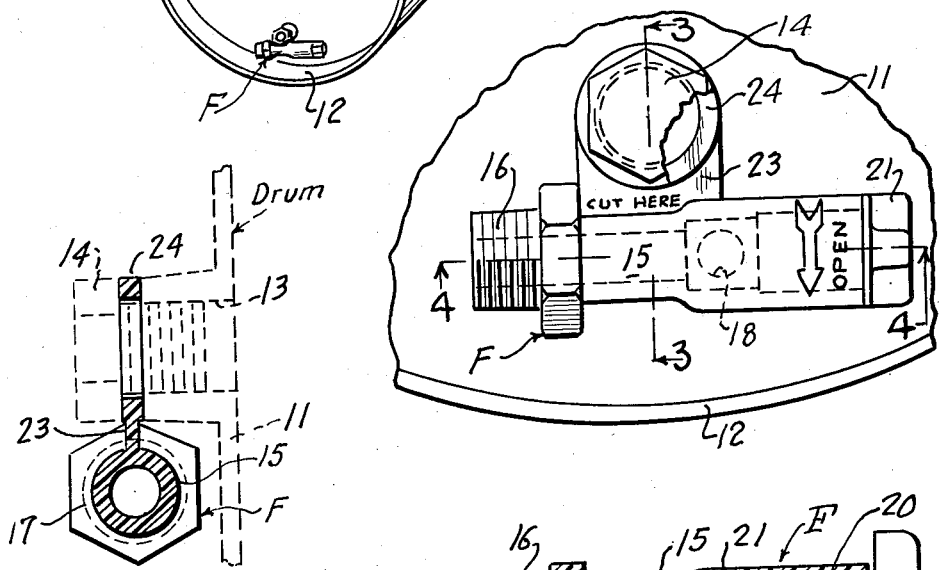
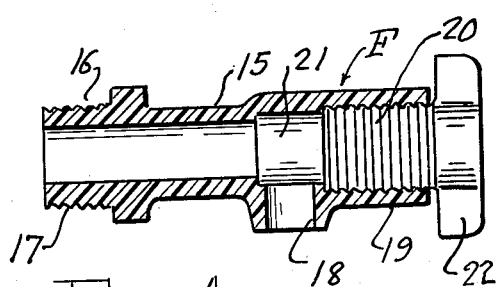
INVENTOR.
Phillip Donald Sanborn
BY
ATTORNEY

United States Patent Office 2,837,255
Patented June 3, 1958

2,837,255
FAUCET-GASKET UNIT FOR DRUMS

Phillip Donald Sanborn, Chardon, Ohio, assignor, by mesne assignments, to National Laboratories, Inc., a corporation of Delaware Application April 13, 1955, Serial No. 501,143

2 Claims. (Cl. 222—538)

This invention relates to a combined faucet and gasket device for large steel drums containing liquids such as chemicals and the like, and an object is to produce a simple and efficient device of this character which can be applied to the drum for transportation or storage purposes in such manner that the gasket is employed for sealing the bung on the head of the drum, the arrangement being such that the faucet is held securely in place and in protected position, and when it is desired to dispense liquid from the drum, the bung is removed and then the faucet mounted in place of the bung, the gasket being severed from the faucet and discarded.

Other objects and advantages of the invention will hereinafter appear and for purposes of illustration but not of limitation, an embodiment of the invention is shown on the accompanying drawings, in which Figure 1 is an end perspective view of a steel drum showing the gasket and faucet unit mounted on the head of the drum, the gasket serving to seal the bung in applied position;

Figure 2 is an enlarged fragmentary elevation showing the gasket and faucet device in position on the head of the drum with the gasket serving to seal the bung;

Figure 3 is a sectional view on the line 3—3 of Figure 2 and

Figure 4 is a longitudinal sectional view on the line 4—4 of Figure 2.

The illustrated embodiment of the invention comprises a steel drum 10 of the usual type having a filling opening on the side closed by a screw plug 10a and recessed heads at opposite ends 11. Projecting outwardly from the heads 11 are cylindrical wall portions 12 so that the heads are in effect recessed from the outer ends of the cylindrical side walls of the drum.

As is customary on drums of this character, a dispensing opening or bung hole 13 is provided on one of the heads 11 in closely spaced relationship to the projecting wall portion 12. The edge portion of the bung hole is screw threaded to receive the usual bung 14.

A combined faucet and gasket device is indicated at F and is formed with an elongate cylindrical body 15 having an externally threaded nipple 16 at one end of the proper size to thread into the bung hole 13. Extending longitudinally of the body 15 is a fluid channel or passage 17 which is adapted to communicate with a lateral spout 18 so that liquid from the drum 10 can be conveniently dispensed. The opposite end of the body is somewhat enlarged as indicated at 19 and the portion on the outer side of the spout 18 is internally screw threaded to receive an externally screw threaded plug valve 20 which is formed with a plain end portion 21 so that when the valve is screwed home, the spout 18 is closed. At the outer end of the plug valve 20 is a flanged head 22 which can be manipulated for opening or closing the valve.

Integral with a side of the device F and disposed at substantially right angles to the spout 18 is a severable web 23, one side of which is adjacent the inner end of the nipple 16. The web projects laterally from the faucet body a short distance and terminates in an annular gasket 24 of a size suitable for the bung 14. Manifestly the size of the gasket 24 may be changed to accommodate various size bungs. Preferably the faucet and gasket device are of a suitable plastic, such for example as polyethylene.

For transportation or storage purposes, the device is mounted on the head of the drum substantially as shown in the drawings, the gasket 24 providing the desired seal for the bung 14, and the spout 18 facing toward the head of the drum so as to protect it. Since the size of the device is considerably less than the depth of the drum wall 12, the drum can be upended without damaging the faucet-gasket device. Thus the gasket actually retains the faucet in place during the shipping or storage of the drum and prior to dispensing its contents.

When it is desired to dispense liquid from the drum, the bung 14 is removed and the screw nipple 16 is applied. Prior thereto, the gasket 24 may be severed by cutting through the web 23 and then discarded since it has served its usefulness. The faucet, of course, is adjusted so that the spout 18 is downwardly disposed and then by manipulation of the valve plug head 22, the contents of the drum may be dispensed at will.

It will be manifest that I have produced an exceedingly simple and practical device which obviates difficulties heretofore experienced in supplying faucets with drums of this character which are available when the customer wants them. In this case, the faucet is always available and can be quickly and readily applied in position of use but up to that time the unit serves an important purpose of sealing the bung and when the bung is tightened against the gasket, the faucet is retained in protective custody until its use is desired.

Numerous changes in details of construction, arrangement and choice of materials may be effected without departing from the spirit of the invention, especially as defined in the appended claims.

What I claim is:

1. In combination with a drum having a recessed head surrounded by peripheral wall, there being a bung hole in the head closed by a removable shouldered bung, a plastic faucet having an attaching threaded nipple at one end to fit the bung hole, said faucet constituting an elongate cylindrical body provided with a longitudinal channel from which extends a lateral spout, a valve controlling the fluid flow from the channel to the spout, the nipple facing the the drum head when the gasket is in position of use, the transverse dimensions of the faucet being substantially less than the distance from the head to the outer edge of the peripheral wall, a laterally projecting gasket portion integral with the faucet and fitting between said bung hole and the flange on the bung, and retaining the faucet within the confines of the peripheral wall in protective custody for shipment, and a severable web between said gasket and faucet so that before the faucet is applied to the bung hole in position of use, the gasket portion may be severed and discarded.

2. The combination claimed in claim 1, the gasket being flat and projecting from the longitudinal central portion of the faucet.

References Cited in the file of this patent
UNITED STATES PATENTS

| | | |
|---|---|---|
| 1,339,578 | Rosenfeld | May 1, 1920 |
| 1,405,099 | Cooke | Jan. 31, 1922 |
| 1,411,573 | McGarrohan | Apr. 4, 1922 |
| 1,959,295 | Van Deerlin et al. | May 15, 1934 |
| 2,118,222 | Nilson | May 24, 1938 |
| 2,250,666 | Godefroy | July 29, 1941 |
| 2,599,472 | Miller | June 3, 1952 |